(12) United States Patent
Zilberberg

(10) Patent No.: US 7,804,194 B2
(45) Date of Patent: Sep. 28, 2010

(54) DEVICE, SYSTEM AND METHOD FOR CHARGER SWITCH ADAPTOR

(75) Inventor: Ofer Zilberberg, Tel Aviv (IL)

(73) Assignee: ODO Innovations Ltd., Tel Aviv (IL)

( * ) Notice: Subject to any disclaimer, the term of this patent is extended or adjusted under 35 U.S.C. 154(b) by 301 days.

(21) Appl. No.: 11/826,777

(22) Filed: Jul. 18, 2007

(65) Prior Publication Data

US 2009/0021077 A1    Jan. 22, 2009

(51) Int. Cl.
  *H02J 7/00*    (2006.01)
  *H02J 9/00*    (2006.01)
(52) U.S. Cl. ......................................... 307/66
(58) Field of Classification Search ............... 307/66
  See application file for complete search history.

(56) References Cited

U.S. PATENT DOCUMENTS

| | | |
|---|---|---|
| 3,783,332 A | 1/1974 | Peterson et al. |
| 6,157,168 A | 12/2000 | Malik |
| 7,230,395 B2 * | 6/2007 | Horii, Yusuke ............ 318/139 |
| 2003/0086024 A1 | 5/2003 | Libera |

FOREIGN PATENT DOCUMENTS

WO    WO 2006/005175    1/2006

OTHER PUBLICATIONS

International Search Report for International Application No. PCT/IL2008/000716 mailed Jan. 14, 2009.

* cited by examiner

*Primary Examiner*—Fritz M Fleming
*Assistant Examiner*—Dru M Parries
(74) *Attorney, Agent, or Firm*—Pearl Cohen Zedek Latzer, LLP

(57) ABSTRACT

A system to connect an electrical device to a switch which connects or disconnects the device to the power source, and providing power to the charger and/or another operational circuit of the device, for example, keep-alive circuit, with no dependency in the state of the switch.

32 Claims, 3 Drawing Sheets

DEVICE, SYSTEM AND METHOD FOR CHARGER SWITCH ADAPTOR

FIELD OF THE INVENTION

The invention relates generally to power electronics, and specifically, to a device and system including a charger switch adaptor, and a method of use thereof.

BACKGROUND OF THE INVENTION

Many electrical devices include chargeable/rechargeable batteries that enable the device to operate, at least temporarily, when not connected to an external power source or when the external power source is disabled, for example, when a power failure occurs. Some of these devices are connected in series to a switch (for example, light switch) which connects or disconnects them to the external power source, such that when external power fails, the device is connected to a battery or batteries. In order to maintain the charge on the batteries, they are typically charged when the switch is off. Typically, a special installation is required, for example, by installation of additional wire to connect the charger to the power source and to provide power to the charger also when the switch is off.

An example of such a device may be dual purpose emergency lighting system that may enable the light source to turn on or off according to the light switch, but activate the light source to work on battery power when there is a power failure.

FIG. 1 illustrates a currently available dual purpose emergency lighting system 200. System 200 may include a power source 22, a light switch 20, a charger 24, a chargeable battery 26, an optional voltage converter 27, an electronic regulation mechanism 28, for example, a DPDT relay, a relay switch 25 and a lamp or other light source 29. When power source 22 is active, regulation mechanism 28 may operate switch 25 to connect light source 29, for example, in series, to light switch 20, thus enabling light source 29 to operate according to the position of switch 20. Charger 24 may be connected to power source 22 through a separate wire not connected to light switch 20, and thus may charge battery 26 with no dependency in the state of light switch 20. When power source 22 is not active, the regulation mechanism 28 may be deactivated, thus connecting light source 29 to the output of voltage converter 27. Voltage converter 27 may optionally be used to boost up the low voltage of battery 26, to match the type and specifications of light source 29. During a power failure battery 26 may be discharged by voltage converter 27 in order to power light source 29. When the power failure ends, regulation mechanism 28 may reconnect light source 29 to light switch 20 and charger 24 may start charging battery 26 to full capacity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
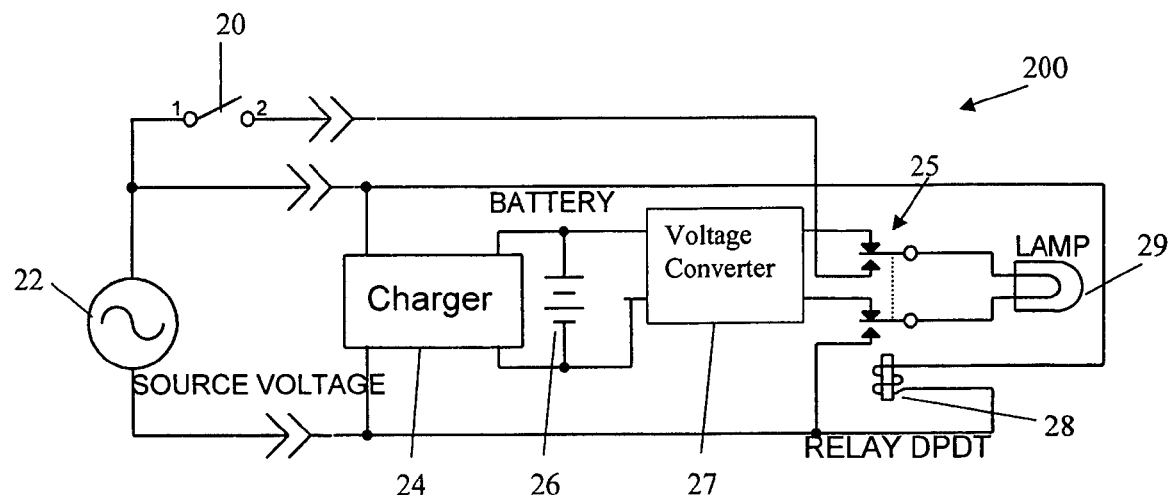
FIG. 1 is a schematic illustration of a currently available dual purpose emergency lighting system.

It will be clarified that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The arrangement of system 200, described in detail above with reference to FIG. 1, may require a special electrical connection, for example, requiring three wires, and may further require special installation and preparation. Accordingly, the arrangement of FIG. 1 may not be simply connected to an existing light fixture or installation, which may typically include two wires connected to the power source.

The three wire arrangement described above is common in installations of electrical devices which require charging energy when the device is off. Similar arrangements are also common in installations of electrical devices that provide some operation/functionality, and therefore need to stay powered, also when the device is off.

These arrangements require special preparation of the electric substructure to add a third wire. Additionally, the electric substructure may need a reversing preparation in case that a regular two-wire device will be replaced with the three-wire device.

Some embodiments of the present invention may provide a two-wire system enabling connection of the device to a switch which connects or disconnects the device to the power source and providing power to the charger and/or another operational circuit of the device, for example, keep-alive circuit, with no dependency in the state of the switch.

Figure 2:
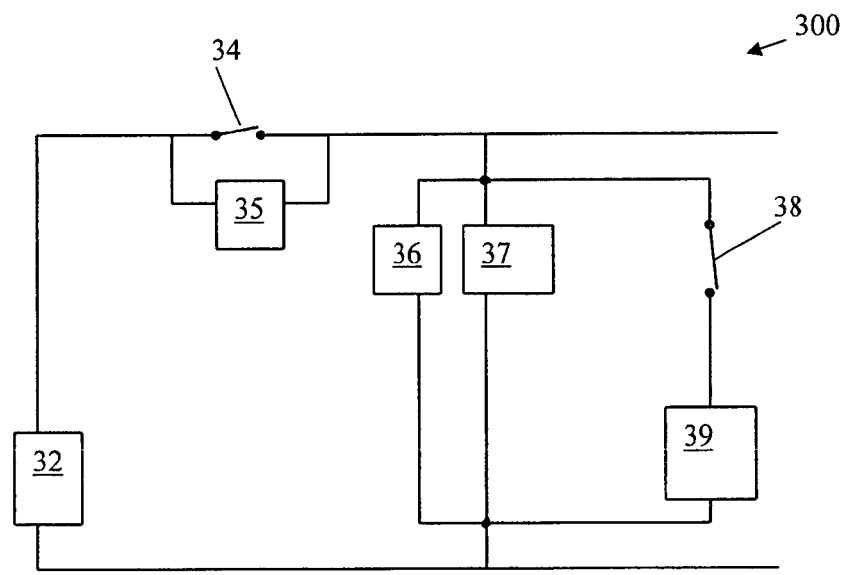
FIG. 2 is a schematic block illustration of a system according to embodiments of the present invention.

Reference is made to FIG. 2, which is a schematic block illustration of a system 300 according to embodiments of the present invention. System 300 may include power source 32, for example, an AC source, a main switch 34, and a main switch bypass element 35 that may provide power to one or several instruments connected in parallel. Each instrument may have an auxiliary switch 38, an electrical device 39, for example, a lighting fixture, a detector circuit 37 and a keep-alive circuit 36. It will be recognized that the illustration of FIG. 2 is schematic only, and in some embodiments of the invention, units or elements may be omitted, added, united, separated or otherwise grouped differently.

In operation, when the main switch 34 is in an off or open-circuit state, bypass element 35 may enable providing power to system 300. In some embodiments of the invention, the power provided through bypass element 35 may be different from the power provided to circuit 300 when main switch 34 is in an on or closed-circuit state. For example, the amplitude and/or the shape of the power signal provided for purposes of charging may be different from those required for operation of the electrical device 39. Accordingly, detector circuit 37 may recognize whether main switch 34 is on or off, for example, by determining a difference in the power signal provided through bypass element 35 or through main switch 34 in closed-circuit state, and depending on the features of the power signal, may activate or deactivate electrical device 39, for example, by controlling a relay coil to operate auxiliary switch 38. For example, when main switch 34 is on, detector circuit 37 may recognize the power signal provided through main switch 34 as the power provided by power source 32, and may connect electrical device 39 via a relay coil to operate auxiliary switch 38. Alternatively, for example, when main switch 34 is off, detector circuit 37 may recognize the power signal provided through main switch 34 as the power provided by power source 32, and may connect electrical device 39 via auxiliary switch 38.

When main switch 34 is turned on, current may flow through main switch 34 and not through bypass element 35, for example, because the resistance of main switch 34 when turned on may be much lower than the impedance of bypass element 35. Some portion of the current may feed keep-alive circuit 36 and detector circuit 37. Detector circuit 37 may control auxiliary switch 38. Detector circuit 37 may sense that main switch 34 is turned on and may fully activate electrical device 39, for example, by connecting auxiliary switch 38. When auxiliary switch 38 is turned on, it may deliver current to electrical device 39.

When main switch 34 is off, current may flow through bypass element 35 and not through main switch 34, because, for example, the resistance of main switch 34 when off may be much higher than the impedance of bypass element 35. The current may feed keep-alive circuit 36 and detector circuit 37. Keep-alive circuitry 36 may include, for example, charger and/or chargeable battery, for example for emergency operation of electrical device 39. Additionally or alternatively, keep alive circuit 36 may maintain some activities of the device when main switch 34 is turned off. Detector circuit 37 may sense that main switch 34 is off and then may deactivate the full functionality of electrical device 39, for example, by turning off auxiliary switch 38 leaving only minimal functionality working inside keep alive circuit 36. When auxiliary switch 38 is off, it may prevent current delivery to electrical device 39.

Bypass element 35 may include any element that enables the operations described above. Bypass element 35 may include, for example, a resistor or other element producing a detectable change at detector 37 between the on and off positions of main switch 34. When main switch 34 is off, the amplitude of the power signal provided through bypass element 35 may be changed compared to the power signal provided through main switch 34 when turned on, for example, because of a resistor included in bypass element 35. In this case, for example, detector circuit 37 may sense the amplitude or other parameter of the power signal that corresponds to the state of main switch 34 and control activation of electrical device 39 accordingly, for example, via auxiliary switch 38.

Additionally or alternatively, bypass element 35 may include, for example, inductors and/or capacitors. When main switch 34 is off, the phase of the power signal provided through bypass element 35 may be changed compared to the power signal provided through main switch 34 when turned on, for example, because of inductors and/or capacitors included in bypass element 35. In this case, for, example, detector circuit 37 may be able to sense the phase of the power signal which corresponds to the state of main switch 34 and control activation of electrical device 39 accordingly, for example, via auxiliary switch 39.

Additionally or alternatively, bypass element 35 may include, for example, diodes, transistors, logic gates, a processor, and/or different kinds of semiconductor devices. When main switch 34 is off, the voltage polarity and/or voltage offset of the power signal provided through bypass element 35 may be changed compared to the power signal provided through main switch 34 when turned on, for example, because of diodes and/or different kinds of semiconductors included in bypass element 35. In this case, for, example, detector circuit 37 may be able to sense the voltage polarity and/or voltage offset of the power signal which correspond to the state of main switch 34 and control activation of electrical device 39 accordingly.

AC power source 32 may provide a sinusoidal voltage. When main switch 34 is off, bypass element 35 may provide, for example, a half rectified sinusoidal voltage, for example, when bypass element 35 includes a diode. Detector circuit 37 may include a half rectified sinusoidal waveform detector to sense when main switch 34 is off.

In some embodiments of the invention, bypass element 35 may be installed together with main switch 34, for example, within a switch case (not shown). The physical dimensions of bypass element 35 may be small enough to enable the installation main switch 34 together with main switch 34 within a switch case. Preferably, the power dissipation which may be produced by bypass element 35 should be low. For example, a small diode may fulfill these conditions. However, the invention is not limited in this respect and main switch 34 may include any combination of the elements described above or any other elements which enable the operation of embodiments of the present invention as described herein.

Detector circuit 37 may be any detector able to detect whether main switch 34 is on or off, for example, detector that senses the physical state of main switch 34, and/or detector which may sense changes in electrical characteristics corresponding to the position of main switch 34, for example, as described above, or in any other suitable manner.

Figure 3:
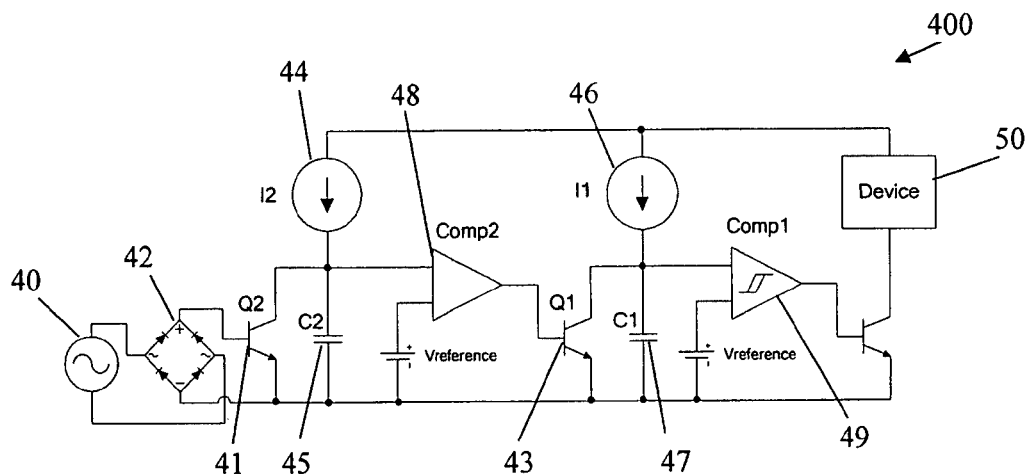
FIG. 3 is a schematic exemplary block illustration of one realization for a detector circuit according to embodiments of the present invention.

In the case of using a diode as bypass element 35, detector circuit 37 may distinguish between full wave and half wave of sinusoidal wave, for example, a missing pulse detector. Reference is made to FIG. 3, which is a schematic exemplary block illustration of a detector circuit 400 according to embodiments of the present invention. Detector circuit 400 may include power input 40. Power input 40 may be provided according to the state of main switch 34, e.g., full sinusoidal voltage when main switch 34 is on or half rectified sinusoidal voltage in the case of using a diode as bypass element 35 when main switch 34 is off. Power input 40 may be provided, for example, to a switched mode power supply, such as, for example, a Pulse-Width Modulation (PWM) controlled power supply. A switched mode power supply may be needed, for example, to enable input with DC components. The detector may control a component for power switching, for example, a solid-state relay, electromechanical relay or other type of switch to activate a device.

Reference is made to FIG. 3, which depicts an embodiment using a diode as a bypass element. Detector circuit 400 may include a rectifier 42, transistor 41, current source 44, capacitor 45, comparator 48, transistor 43, current source 46, capacitor 47, comparator 49 and device 50 controlled by detector circuit 400. Rectifier 42 may adjust the polarity of the input voltage. Rectifier 42 may include, for example, a diode bridge (bridge rectifier), optic isolator, or any other element to adjust the polarity of the input voltage. Transistor 41 may conduct current substantially as long the base of transistor 41 is provided with positive power from rectifier 42, except during short periods when the power is sufficiently close to zero, depending on the specific properties of the specific transistor being used. Current source 44 and capacitor 45 may generate a ramp signal with a certain time constant, e.g. a certain slope. When transistor 41 conducts current, it may reset the ramp signal generated by current source 44 and capacitor 45. Comparator 48 may compare the signal generated by current source 44 and capacitor 45 to a reference voltage, and may provide power to the base of transistor 43, for example, only when the signal generated by current source 44 and capacitor 45 exceeds the reference voltage. Transistor 43 may conduct current, for example, when positive power is provided to its base.

Current source 46 and capacitor 47 may generate a ramp signal with a certain time constant, e.g. a certain slope. When transistor 43 conducts current, it may reset the signal generated by current source 46 and capacitor 47. Comparator 49 may compare the signal generated by current source 46 and capacitor 47 to a reference voltage. When the signal generated by current source 46 and capacitor 47 is below the reference voltage, comparator 49 may cause deactivation of device 50. Device 50 may be an end device or a power switch to control other device, for example, a solid-state relay, electromechanical relay or other type of switch to activate a device.

Embodiments of the present invention are not limited to the example of FIG. 3 and may use other detector circuits to detect the status of main switch 34. Detector circuits according to embodiments of the present invention may include other equivalent components which function similarly to the components described with reference to FIG. 3.

Figure 4:
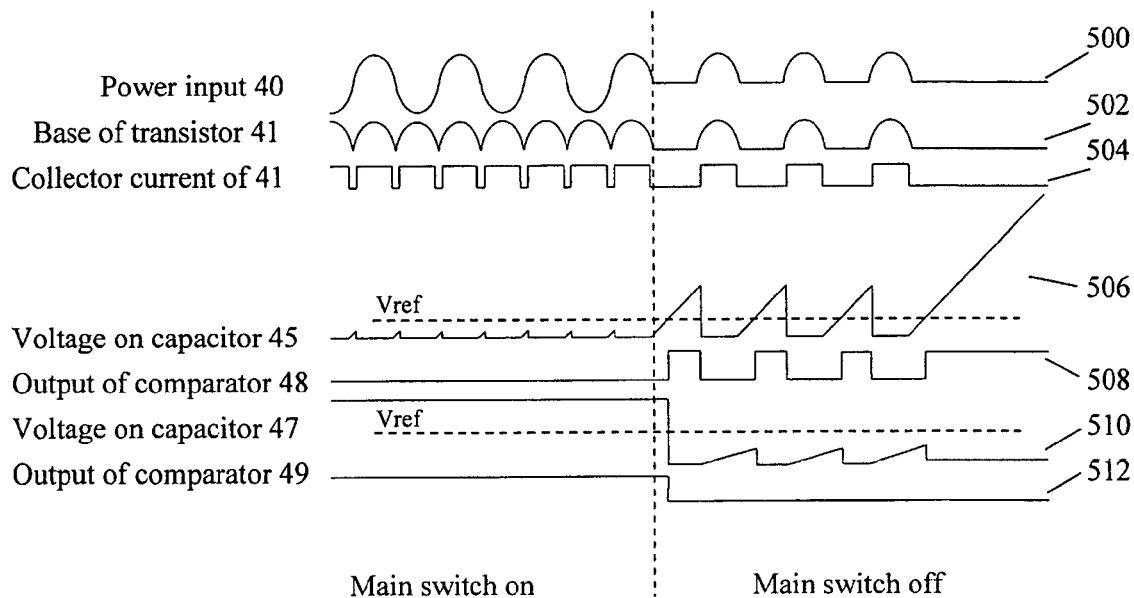
FIG. 4 includes schematic graph illustrations of changes along the time axis in signals of several elements in one realization for a detector circuit according to some embodiments of the present invention.

Reference is made to FIG. 4, which includes schematic graph illustrations of changes along the time axis in signals of several elements in detector circuit 400 according to some embodiments of the present invention. As shown in graph 500, when main switch 34 is on, power input 40 may be a full sinusoidal voltage. Rectifier 42 may adjust the polarity of the sinusoidal voltage, for example, by changing the polarity of the negative half of the signal to become positive, so that, for example, as shown in graph 502, the power provided to the base of transistor 41 may be positive most of the time. Transistor 41 may conduct current through its collector as long as positive power is provided through the base. As shown in graph 504, when main switch 34 is on, transistor 41 may conduct current most of the time, except in short periods when the power provided to the base of transistor 41 is substantially zero. When main switch 34 is off, power input 40 may be a half rectified sinusoidal voltage, for example, in case that bypass element 35 includes a diode. In this case, the periods in which the power provided to the base of transistor 41 is substantially zero may be longer, and therefore the periods in which transistor 41 may not conduct current may be longer.

As shown in graph 506, current source 44 and capacitor 45 may generate a ramp voltage on capacitor 45 with a certain time constant. The ramp voltage on capacitor 45 may be reset whenever transistor 41 conducts current. As shown in graph 508, comparator 48 may provide power whenever the voltage on capacitor 45 exceeds a reference voltage. When main switch 34 is on, transistor 41 conducts current most of the time, and the ramp voltage on capacitor 45 may not manage to exceed the reference voltage. When main switch 34 is off, the ramp voltage on capacitor 45 may manage to exceed the reference voltage in the periods when transistor 41 may not conduct current. Comparator 48 may provide power to the base of transistor 43 in the periods when the voltage on capacitor 45 exceeds a reference voltage. As shown in graph 510, current source 46 and capacitor 47 may generate a ramp voltage on capacitor 47 with a certain time constant. The ramp voltage on capacitor 47 may be reset whenever transistor 43 conducts current. As shown in graph 512, comparator 49 may provide power whenever the voltage on capacitor 47 exceeds a reference voltage. When main switch 34 is off, transistor 43 may conduct current in the periods when the ramp voltage on capacitor 45 may manage to exceed the reference voltage. The ramp voltage on capacitor 47 may not manage to exceed the reference voltage in the periods when transistor 43 may not conduct current, for example, because the time constant of the ramp voltage on capacitor 47 may be relatively large. Therefore, when main switch 34 is off, comparator 49 may not provide power, thus, for example, causing deactivation of device 50. When main switch 34 is on, the ramp voltage on capacitor 47 may exceed the reference voltage and/or comparator 49 may provide power, thus, for example, enabling activation of device 50.

Therefore, a detector switch such as detector circuit 400 may be used for adaptation of an end device to the state of main switch 34 for activation or deactivation of the device, while at the same time power may be provided to a charger or a keep alive circuit through bypass element 35, without dependency on the state of main switch 34. Connection to power source 32 through main switch 34 and bypass element 35 may be enabled for devices with keep alive circuits and/or chargers that may be required to receive power without dependency on the state of main switch 34, and at the same time for devices that need to be activated according to main switch 34, due to detector circuit 400, which may adapt such devices to be activated according to the state of main switch 34 in spite of bypass element 35.

Figure 5:
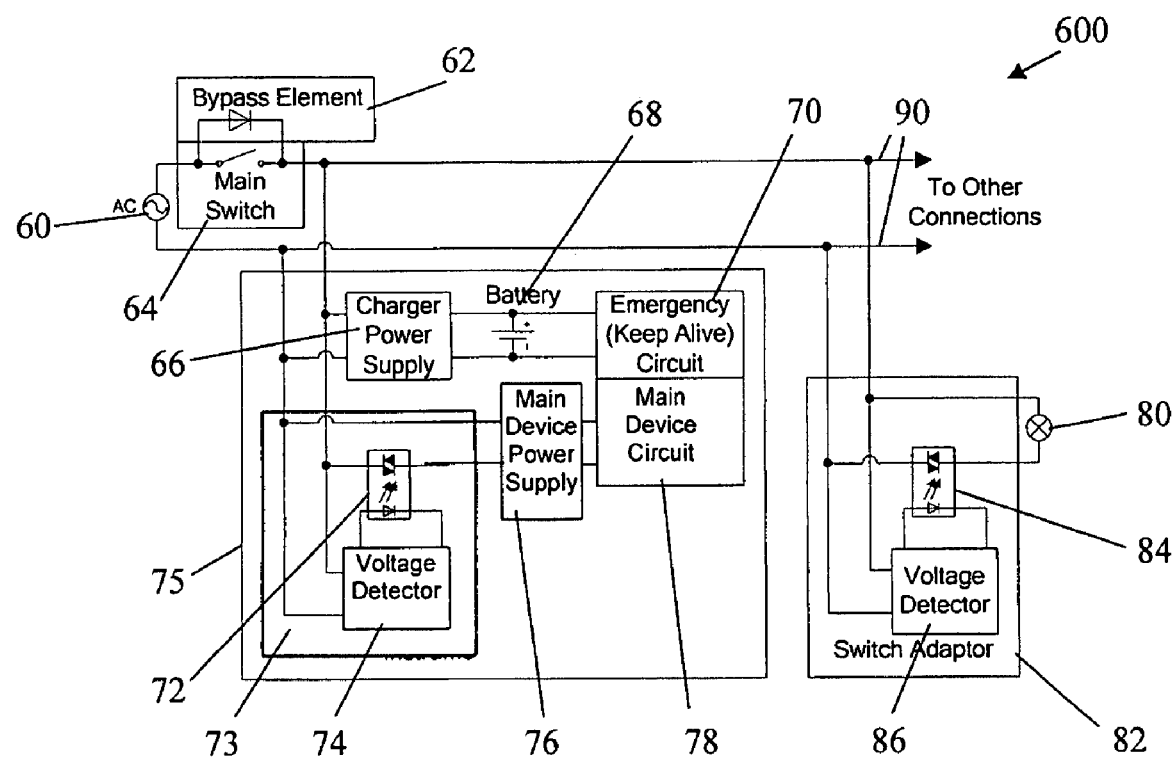
FIG. 5 is a schematic illustration of a system with two types of subsystem (adaptors) according to embodiments of the present invention.

An example of such connection to different kinds of devices is illustrated in FIG. 5, which is a schematic illustration of system 600 according to embodiments of the present invention. System 600 may include a power source 60, a main switch 64, a bypass element 62, an emergency device 75, a switch adaptor 82 and an end device 80. Emergency device 75 and switch adaptor 82 may be connected to power source 60 through main switch 64 and bypass element 62, for example, by two wires 90. Other devices may be connected to power source 60, for example, by the same two wires 90. Main switch 64 may control centrally the devices connected through two wires 90.

Emergency device 75 may include charger 66, battery 68, keep alive circuit 70, switch adaptor 73, main device power supply 76 and main device circuit 78. Emergency device 75 may be able to activate main device circuit 78 according to the state of main switch 64 regardless to bypass element 62, while receiving power for charger 66 and/or keep alive circuit 70 through main switch 64 when turned on or through bypass element 62 when main switch 64 is off. Switch adaptor 73 may include detector circuit 74 and auxiliary switch 72, which may adapt the activation of main device power supply 76 and/or main device main circuit 78 to the state of main switch 64, as discussed in detail above with reference to FIGS. 2 to 4. Detector circuit 74 may detect the state of main switch 64 and accordingly control auxiliary switch 72, which may be, for example, a solid-state relay, electromechanical relay or other type of switch to activate main device power supply 76 and/or main device main circuit 78. As discussed above, detector circuit 74 may distinguish the voltage provided through bypass element 62 when main switch 64 is off from the voltage or another parameter provided through main switch 64 when on, and turn auxiliary switch 72 on or off according to the detected voltage. When main switch 64 is off, bypass element 62 may provide, for example, a half rectified sinusoidal voltage. Charger 66 may provide power to keep alive circuit and/or battery 68. Charger 66 may include some sort of bridge rectifier (not shown) in order to be able to charge battery 68 and/or provide power to keep alive circuit 70 whether a half sinusoidal wave or full sinusoidal wave is provided to charger 66. Battery 68 may provide power to emergency device 75, for example, in case of power failure. Keep alive circuit 70 may keep activation of main device circuit 78 and/or standby mode and/or some essential operations during, for example, an emergency. Thus, for example, arrangement similar to system 600 may enable forcing multiple devices into a keep alive or standby mode through a single main switch. In some embodiments, detector circuit 74 may be powered by charger 66, for example, instead of or in addition to including a power supply as discussed above with reference to FIG. 3.

End device 80 may or may not be designed to work with a half sinusoidal voltage and therefore if it is not, the end device 80 may be connected to power source through switch adaptor 82, which may activate end device 80 only when main switch 64 is on, and thereby a full sinusoidal voltage is provided. Switch adaptor 82 may include detector circuit 86 and auxiliary switch 84. Switch adaptor 82, detector circuit 86 and auxiliary switch 84 may operate similarly to switch adaptor 73, detector circuit 74 and auxiliary switch 72 and as discussed in detail above with reference to FIGS. 2 to 4.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system comprising:
   a bypass element associated with a main switch connected to a power supply, said bypass element to provide power having a power characteristic with a first value when the main switch is off and having a second value when the main switch is on;
   a detector circuit to detect whether the main switch is on or off based on the value of the power characteristic; and
   an auxiliary switching element to connect a device to the power supply if the main switch is in an on state and to disconnect the device from the power supply if the main switch is in an off state.

2. The system according to claim 1, wherein said auxiliary switching element comprises at least one active component selected from the group consisting of a silicon controlled rectifier (SCR), transistor, a solid-state relay, and an electromechanical relay.

3. The system according to claim 1, further comprising a charger unit to receive power through said main switch when the main switch is in the on state, and to receive power through said bypass element when the main switch is in the off state.

4. The system according to claim 3, wherein said charger unit provides power to a keep alive circuit, said keep alive circuit to maintain predefined operations of the device regardless of the state of the main switch.

5. The system according to claim 3, wherein said charger charges a battery to power the device during a power failure event at said power source.

6. The system according to claim 1, wherein said bypass element is connected in parallel to said main switch.

7. The system according to claim 6, wherein said bypass element comprises at least one component selected from the group consisting of a diode, a resistor, a capacitor, an inductor, and a processor.

8. The system according to claim 1, wherein said characteristic is power amplitude and said detector circuit is able to detect an amplitude value of a power signal.

9. The system according to claim 1, wherein said characteristic is power phase and said detector circuit is able to detect a phase value of a power signal.

10. The system according to claim 1, wherein said characteristic is voltage polarity and said detector circuit is able to detect a polarity value of a power signal.

11. The system according to claim 1, wherein said characteristic is voltage offset and said detector circuit is able to detect a voltage offset of a power signal.

12. The system according to claim 1, wherein said characteristic is voltage rectification and said detector circuit is able to detect whether a power signal is half-wave or full-wave rectified.

13. The system according to claim 1, wherein said characteristic is voltage waveform and said detector circuit is able to detect whether or not a power signal is a full sinusoidal waveform.

14. A switch adaptor comprising:
    a detector circuit to sense the state of a main switch and control activation of at least one device according to the sensed state of said main switch, wherein said sensing is performed according to at least one detected characteristic of a waveform of A/C power through a bypass element bypassing said main switch, wherein said detector circuit is to cause de-activation of said device when said main switch is off.

15. A switch adaptor according to claim 14, further comprising an auxiliary switch controlled by said detector circuit to activate at least one device according to the sensed state of said main switch.

16. A switch adaptor according to claim 14, wherein said auxiliary switch comprise at least one component selected from the group comprising a solid-state relay and electromechanical relay.

17. A switch adaptor according to claim 14, wherein said detector circuit is able to sense amplitude of a power signal, the amplitude corresponding to the state of said main switch.

18. A switch adaptor according to claim 14, wherein said detector circuit is able to sense phase of a power signal, the phase corresponding to the state of said main switch.

19. A switch adaptor according to claim 14, wherein said detector circuit is able to sense voltage polarity and/or voltage offset of a power signal, the voltage polarity and/or voltage offset corresponding to the state of said main switch.

20. A switch adaptor according to claim 14, wherein said detector circuit is able to distinguish a half rectified sinusoidal voltage from a full sinusoidal voltage, which correspond to off and on states of said main switch respectively.

21. A switch adaptor according to claim 14, wherein said detector circuit is able to distinguish a full sinusoidal voltage from another, pre-defined, waveform, said waveforms corresponding to off and on states of said main switch, respectively.

22. An emergency device comprising:
    a detector circuit to sense the state of a main switch and control activation of at least one device according to the sensed state of said main switch, wherein said sensing is performed according to at least one detected characteristic of a waveform of A/C power through a bypass element bypassing said main switch, wherein said detector circuit is to cause de-activation of said device when said main switch is off; and a charger to receive power through said main switch when said main switch is on and through said bypass element when said main switch is off.

23. An emergency device according to claim 22, further comprising an auxiliary switch controlled by said detector circuit to activate said device according to the sensed state of said main switch.

24. An emergency device according to claim 23, wherein said auxiliary switch comprise at least one component selected from the group comprising a solid state relay, an electronic switch, and electromechanical relay.

25. An emergency device according to claim 22, wherein said charger provides power to a keep alive circuit to keep some operations of said device at least when said main switch is off.

26. An emergency device according to claim 22, wherein said charger charges a battery to power the device at least during a power failure.

27. An emergency device according to claim 22, wherein said detector circuit is able to sense amplitude of a power signal, the amplitude corresponding to the state of said main switch.

28. An emergency device according to claim 22, wherein said detector circuit is able to sense phase of a power signal, the phase corresponding to the state of said main switch.

29. An emergency device according to claim 22, wherein said detector circuit is able to sense voltage polarity and/or voltage offset of a power signal, the voltage polarity and/or voltage offset corresponding to the state of said main switch.

30. An emergency device according to claim 22, wherein said detector circuit is able to distinguish a half rectified sinusoidal voltage from a full sinusoidal voltage, which correspond to off and on states of said main switch respectively.

31. An emergency device according to claim 22, wherein said detector circuit is able to distinguish a full sinusoidal voltage from another, pre-defined, waveform, said waveforms corresponding to off and on states of said main switch, respectively.

32. A switch adaptor according to claim 14, wherein said detector circuit is further to provide power to a keep-alive circuit when the main switch is off.

* * * * *